UNITED STATES PATENT OFFICE.

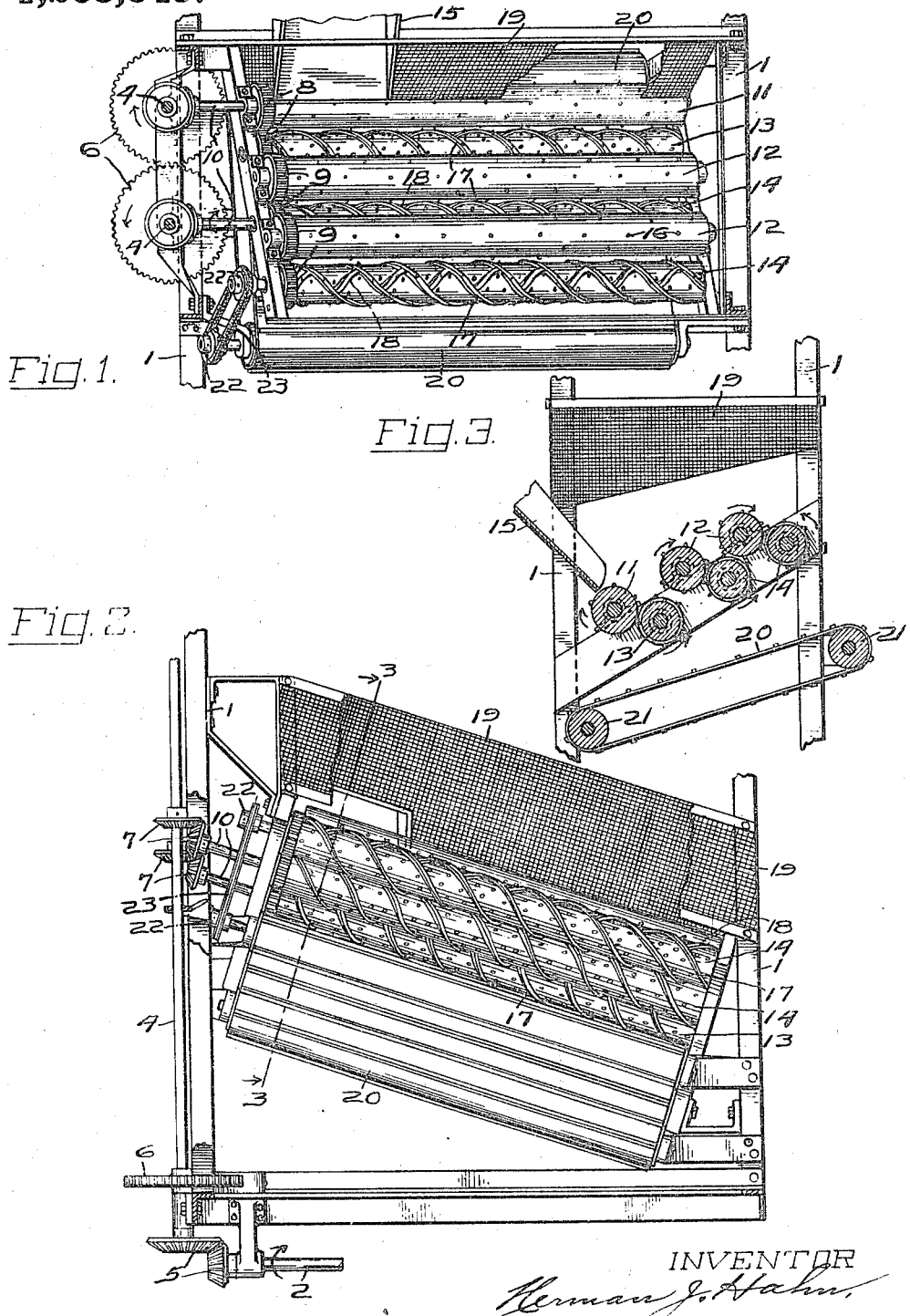

HERMAN J. HAHN, OF NAPOLEON, OHIO.

CORN-HUSKER.

1,268,345.
Specification of Letters Patent.
Patented June 4, 1918.

Application filed February 25, 1916. Serial No. 80,537.

*To all whom it may concern:*

Be it known that I, HERMAN J. HAHN, a citizen of the United States, and a resident of Napoleon, in the county of Henry and State of Ohio, have invented a certain new and useful Corn-Husker; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to corn husking devices. The construction containing my invention may be used in connection with and mounted on the same frame as that of a corn harvester, whereby the corn as fast as it is removed from the stalks may be directed into the husker and the corn may be husked by the husker, or the husker may be located at any point and may be made stationary for the purpose of husking corn brought to it.

The invention may be contained in different forms of construction. I have selected one of such forms of construction for the purpose of illustrating constructions containing the invention and shall describe the construction selected hereinafter. The construction selected is illustrated in the accompanying drawings.

Figure 1 is a top view of the husker, Fig. 2 is a side view and Fig. 3 is a sectional view taken on the line 3—3 indicated in Fig. 2.

In the several views shown in the drawings, 1 is the supporting frame. 2 is a shaft which may be connected with any suitable source of power by means of which the moving parts of the husker operate to husk the corn. It is connected to the vertical shafts 4 through the bevel gear wheels 5 and the spur gear wheels 6.

A bank of husking rollers arranged in pairs are rotated by the shafts 4 to which they are connected by bevel gear wheels 7 and the shafts 10, and interconnected by spurred gear wheels 8 and 9.

Each successive pair of rollers are located on a higher plane and parallel with the adjacent pair of rollers and the rollers of the several pairs are longitudinally inclined. Also each pair of rollers are located in planes that are inclined so that one roller of each pair is higher than the associated roller of that pair, that is, the rollers 11 and 12 of the pairs are higher than the rollers 13 and 14 respective so as to coact in a measure to raise the corn to the highest pair of rollers. The corn is fed to the husker through a chute 15, which is located near the upper end of the roller 11. The longitudinal downward inclination of the rollers tend to carry the corn downward but the rollers 11 and 12 having the sharp pointed teeth 16 tend to lift the corn, particularly when it is fed too fast to be cared for by the lower pair of rollers, to the next higher pair of rollers in each case.

Rollers 13 and 14 are not only provided with the sharp teeth 16, but are also provided with a plurality of spirally located rods which are secured to the surfaces of the rollers. The spirally located rods 17 are preferably square in cross section. Intermediate the rods 17 and in spaced relation are located a plurality of short rods 18 which extend transverse to the rods 17. The rods 18 may be located parallel to each other and on opposite sides of the rollers, or they may be located on one side only of each roller. While the spiral rods 14 operate to work the corn downward, the cross bars 18 operate to snub the ends of any of the corn that may be turned into an upright position between the rollers or that may be located transverse to the axes of the rollers. During the rotation of the rollers 13 and 14, the cross bars 18 tend to disturb any of the ears of corn that do not lie parallel with the rollers.

The bank of rollers may be surrounded by suitable screen 19 to confine the ears of corn and prevent them from being thrown out by the operation of the rollers in the husking process.

A belt 20 may be located below the bank of rollers. It may be moved beneath the bank by means of rollers 21, one of the rollers 21 being connected with any means to cause the roller to rotate, and thus cause the belt to move to carry away the husks that may be removed from the corn by the operation of the rollers. One of the rollers 21 may be connected to one of the rollers 14 by means of sprocket wheels 22 and the sprocket chain 23.

I claim :—

1. In a corn husker, a bank of husking rollers arranged in pairs, each successive pair being located on a higher plane and parallel with the adjacent pair, and the rollers of the several pairs longitudinally inclined.

2. In a corn husker, a bank of husking rollers arranged in pairs, each successive pair on a higher plane and parallel with the adjacent pair and the plane of each pair of rollers inclined in direction transverse the bank of rollers and the rollers of the several pairs longitudinally inclined.

3. In a corn husker, a bank of husking rollers arranged in pairs, each successive pair on a higher plane, one of each pair of rollers having husk engaging prongs and the other of each pair of rollers having husk bars, the rollers having husk engaging prongs located in one plane and the rollers having the husking bars located in another plane parallel to the plane in which the rollers having the husking engaging prongs are located, the rollers of the several pairs being longitudinally inclined.

In testimony whereof, I have hereunto signed my name to this specification.

HERMAN J. HAHN.

Copies of this patent may be obtained for five cents each, by addressing the "Commissioner of Patents, Washington, D. C."